(12) United States Patent
Peralta et al.

(10) Patent No.: US 9,023,134 B2
(45) Date of Patent: May 5, 2015

(54) IM-21 ORGANIC-INORGANIC HYBRID SOLID AND PROCESS FOR PREPARING SAME

(75) Inventors: David Peralta, Lyons (FR); Karin Barthelet, Lyons (FR); Gerhard Pirngruber, Charly (FR); Gerald Chaplais, Mulhouse (FR); Angelique Simon-Masseron, Brunstatt (FR); Joel Patarin, Flaxlanden (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 108 days.

(21) Appl. No.: 13/989,076

(22) PCT Filed: Nov. 23, 2011

(86) PCT No.: PCT/FR2011/000616
§ 371 (c)(1),
(2), (4) Date: Aug. 21, 2013

(87) PCT Pub. No.: WO2012/069714
PCT Pub. Date: May 31, 2012

(65) Prior Publication Data
US 2013/0319234 A1 Dec. 5, 2013

(30) Foreign Application Priority Data
Nov. 26, 2010 (FR) ..................... 10/04605

(51) Int. Cl.
| | | |
|---|---|---|
| B01J 20/22 | (2006.01) | |
| B01J 20/28 | (2006.01) | |
| B01J 20/30 | (2006.01) | |
| B01J 31/16 | (2006.01) | |
| B01J 31/22 | (2006.01) | |
| B01J 35/00 | (2006.01) | |
| B01J 37/03 | (2006.01) | |
| B01J 37/10 | (2006.01) | |
| B01J 23/06 | (2006.01) | |
| B01J 35/10 | (2006.01) | |
| B01D 53/02 | (2006.01) | |

(52) U.S. Cl.
CPC .......... *B01J 20/226* (2013.01); *B01J 20/28011* (2013.01); *B01J 20/2809* (2013.01); *B01J 20/30* (2013.01); *B01J 20/3064* (2013.01); *B01J 31/1691* (2013.01); *B01J 31/2239* (2013.01); *B01J 35/002* (2013.01); *B01J 37/038* (2013.01); *B01J 37/10* (2013.01); *B01J 2531/0216* (2013.01); *B01J 2531/26* (2013.01); *B01J 23/06* (2013.01); *B01J 35/1019* (2013.01); *B01D 53/02* (2013.01); *B01J 31/2213* (2013.01)

(58) Field of Classification Search
CPC .. B01D 53/02; B01J 20/226; B01J 20/28011; B01J 20/2809; B01J 20/30; B01J 20/3064; B01J 23/06; B01J 2531/0216; B01J 2531/26; B01J 31/1691; B01J 31/2213; B01J 31/2239; B01J 35/002; B01J 35/1019; B01J 37/038; B01J 37/10; Y02C 10/08
See application file for complete search history.

(56) References Cited

U.S. PATENT DOCUMENTS

| | | |
|---|---|---|
| 6,893,564 B2 | 5/2005 | Mueller et al. |
| 2003/0222023 A1 | 12/2003 | Mueller et al. |

FOREIGN PATENT DOCUMENTS

| | | |
|---|---|---|
| DE | 102009027821 A1 | 1/2010 |
| WO | 03102000 A1 | 12/2003 |

OTHER PUBLICATIONS

International Search Report from PCT/FR2011/000616 dated Feb. 16, 2013.
Nathaniel L. Rosi et al. "Rod Packings and Metal-Organic Frameworks Constructed from Rod-Shaped Secondary Building Units" Journal of the American Chemical Society, vol. 127, No. 5, [Jan. 13, 2005], pp. 1504-1518.
D. J. Tranchemontagne, et al. "Room temperature synthesis of metal-organic frameworks: MOF-5, MOF-74, MOF-177, MOF-199, and IRMOF-0" Tetrahedron, Elsevier Science, vol. 64, No. 36, [Sep. 1, 2008], pp. 8553-8557.
P. Dietzel, et al. "Structural Changes and Coordinatively Unsaturated Metal Atoms on Dehydration of Honeycomb Analogous Microporous Metal-Organic Frameworks" Chemistry-A European Journal, vol. 14, No. 8, [Jan. 18, 2008], pp. 2389-2397.
English Translation of Abstract for DE102009027821A1 dated Jan. 28, 2010.

*Primary Examiner* — Christopher P Jones
(74) *Attorney, Agent, or Firm* — Millen, White, Zelano & Branigan, P.C.

(57) ABSTRACT

A novel crystalline hybrid solid with a mixed organic-inorganic matrix is described which has a three-dimensional structure containing an inorganic framework with metallic centers based on zinc connected together via deprotonated organic ligands constituted by the entity $-O_2C-C_6H_2-(O)_2-CO_2$. This novel solid is termed IM-21 and has an X-ray diffraction diagram as given below.

19 Claims, 1 Drawing Sheet

IM-21 ORGANIC-INORGANIC HYBRID SOLID AND PROCESS FOR PREPARING SAME

FIELD OF THE INVENTION

The present invention relates to a novel crystalline hybrid solid with a mixed organic-inorganic matrix and a three-dimensional structure, and to a process for its preparation. Said novel solid forming the subject matter the present invention will be termed IM-21 in the remainder of the description. The present invention also relates to the use of said IM-21 solid as a catalyst or adsorbent.

PRIOR ART

The family of porous solids, which is of undeniable importance both in everyday life and in industrial applications, is a source of major and enduring interest and research carried out in the field of materials.

Since the 1990s, particular attention has been paid to hybrid compounds with a mixed organic-inorganic matrix, also known as MOFs (metal-organic frameworks) or coordination polymers. MOFs are porous crystalline solids in which the sub-frameworks of metallic cations (dimers, trimers, tetramers, chains, planes) are connected together via organic molecules serving as multidentate ligands in order to form a two- or three-dimensional structure.

Because of the diversity of possible combinations of the inorganic connector and the organic ligand, this class of materials can be used to create an immense number of novel structures.

Nevertheless, of the large number of structures which have already been synthesized, only a small fraction has a porosity which is accessible. However, accessibility to the pores is an essential property for the use of these materials as a catalyst or adsorbent. Various reasons can be used to explain the absence of accessible porosity in hybrid materials: either the structure of the hybrid material is too dense, or the pore openings are too small. Added to these two explanations, in some cases the crystalline structure of the hybrid material which in theory should have accessible pores has molecules of solvent and/or organic ligands which remain trapped in the structure after synthesis, impeding access to the pores.

Known hybrid materials of particular interest are usually based on organic ligands constituted by di- or tricarboxylates or pyridine derivatives. Some organic ligands which are frequently encountered are: bdc=benzene-1,4-dicarboxylate, btc=benzene-1,3,5-tricarboxylate, ndc=naphthalene-2,6-dicarboxylate, $H_4$dhtp=2,5-dihydroxyterephthalic acid bpy=4,4'-bipyridine, hfipbb=4,4'-(hexafluoroisopropylidene)-bis-benzoate, cyclam=1,4,8,11-tetraazacyclotetradecane.

In the context of the present invention, the compound used as a precursor of the ligand present in the solid of the invention is 2,5-dihydroxyterephthalic acid ($H_4$dhtp). The organic entity acting as a connector is zinc.

DESCRIPTION OF THE INVENTION

Figure 1:
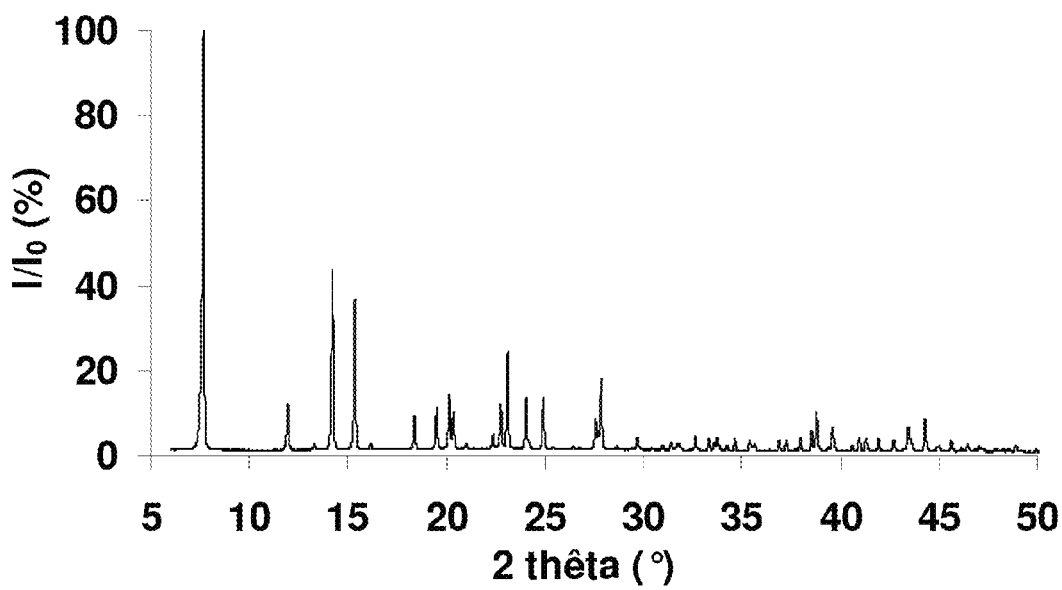
FIG. 1: X-ray diffraction diagram of IM-21.

The present invention concerns a novel crystalline hybrid solid with a mixed organic-inorganic matrix having a three-dimensional structure. This novel solid is termed IM-21. It contains an inorganic framework with metallic centres based on zinc connected together via deprotonated organic ligands constituted by the entity $-O_2C-C_6H_2-(O)_2-CO_2$. The acid and hydroxide functions of the 2,5-dihydroxyterephthalic acid with formula $-O_2C-C_6H_2-(O)_2-CO_2$ are deprotonated.

The IM-21 crystalline hybrid solid of the present invention has an X-ray diffraction diagram including at least the peaks recorded in Table 1. This diffraction diagram is obtained by radiocrystallographic analysis using a diffractometer and employing the conventional powder method with the $K\alpha 1$ line of copper ($\lambda=1.5406$ Å). From the position of the diffraction peaks represented by the angle $2\theta$, the characteristic interplanar spacings, $d_{hkl}$, of the sample are calculated by applying the Bragg relationship. The error in the measurement, $\Delta(d_{hkl})$ over $d_{hkl}$, is calculated as a function of the absolute error $\Delta(2\theta)$ in the measurement of $2\theta$ using the Bragg relationship. An absolute error of $\Delta(2\theta)$ equal to $\pm 0.2°$ is generally acceptable. The relative intensity $I/I_0$ computed for each value of $d_{hkl}$ is measured from the height of the corresponding diffraction peak. The X-ray diffraction diagram of the IM-21 crystalline hybrid solid of the invention comprises at least the peaks with the values of $d_{hkl}$ given in Table 1. The mean values given for the interplanar spacings in the $d_{hkl}$ column are in Angströms (Å). Each of these values is subject to an error measurement $\Delta(d_{hkl})$ in the range $\pm 0.3$ Å to $\pm 0.01$ Å.

TABLE 1

Mean values for $d_{hkl}$ and relative intensities measured on an X-ray diffraction diagram of IM-21 crystalline hybrid solid

| $2\theta$ (°) | $I/I_0$ | $d_{hkl}$ (Å) |
|---|---|---|
| 7.66 | s | 11.53 |
| 11.96 | w | 7.39 |
| 13.29 | w | 6.66 |
| 14.22 | m | 6.23 |
| 15.35 | m | 5.77 |
| 18.39 | w | 4.82 |
| 19.50 | w | 4.55 |
| 20.15 | w | 4.40 |
| 20.36 | w | 4.36 |
| 22.36 | w | 3.97 |
| 22.75 | w | 3.91 |
| 23.11 | mw | 3.84 |
| 24.04 | w | 3.70 |
| 24.91 | w | 3.57 |
| 27.57 | w | 3.23 |
| 27.87 | mw | 3.20 |
| 29.70 | w | 3.01 |
| 32.66 | w | 2.74 |
| 33.75 | w | 2.65 |
| 34.65 | w | 2.59 |
| 36.89 | w | 2.44 |
| 37.26 | w | 2.41 |
| 37.97 | w | 2.37 |
| 38.55 | w | 2.33 |
| 38.79 | w | 2.32 |
| 39.60 | w | 2.28 |
| 40.96 | w | 2.20 |
| 41.30 | w | 2.18 |
| 43.46 | w | 2.08 |
| 44.31 | w | 2.04 | where s=strong; m=medium; mw=medium weak; w=weak. The relative intensity $I/I_0$ is given using a relative intensity scale whereby a value of 100 is attributed to the most intense peak of the X-ray diffraction diagram: w<15; 15≤mw<30; 30≤m<85; s≥85.

The IM-21 crystalline hybrid solid is classified as a hexagonal system P, with lattice parameters a=b=23.0688 Å, c=15.9260 Å, V=7339.4 Å$^3$ and the angles $\alpha=\beta=90°$, $\gamma=120°$.

The IM-21 crystalline hybrid solid in accordance with the invention has a basic crystalline structure or topology which is characterized by its X-ray diffraction diagram given in FIG. 1. Said solid has a chemical composition with $Zn_2(-O_2C-C_6H_2(O)_2-CO_2-)$ as the base motif. This motif is repeated n times, with n generally being more than 100.

The IM-21 crystalline hybrid solid of the invention has a three-dimensional structure in which the inorganic framework of metallic centres based on $Zn^{2+}$ cations acting as connectors are bonded together by means of deprotonated terephthalic ligands carrying two deprotonated hydroxide functions on the aromatic ring in positions 2 and 5 ($-O_2C-C_6H_2(O)_2-CO_2-$).

The present invention also pertains to a process for the preparation of said IM-21 crystalline hybrid solid having a mixed organic-inorganic matrix. This process comprises at least the following steps:
i) preparing, in an aqueous medium, a reaction mixture containing at least one zinc precursor and 2,5-dihydroxyterephthalic acid (denoted $H_4$dhtp) present in a mixture of solvents comprising at least N,N-dimethylformamide (DMF) and propanol ($C_3H_7OH$) in a proportion such that said reaction mixture has the following molar composition, based on one molar equivalent of the element zinc:

1 Zn: 0.1-2 $H_4$dhtp: 1-50 $H_2O$: 3-10 $C_3H_7OH$: 50-300 DMF ii) carrying out a solvothermal treatment of said reaction mixture at a temperature in the range 150° C. to 290° C. in order to obtain said IM-21 crystalline hybrid solid in the as-synthesised form;
iii) filtering, washing and drying said IM-21 crystalline hybrid solid;
iv) heat treating said IM-21 crystalline hybrid solid obtained from said step iii).

In accordance with said step i) of the process for preparing the IM-21 crystalline hybrid solid of the invention, the zinc precursor is advantageously selected from zinc (II) salts such as zinc chlorides, sulphates, acetates or nitrates. Highly preferably, said precursor which is used is a zinc nitrate. 2,5-dihydroxyterephthalic acid ($-O_2C-C_6H_2-(O)_2-CO_2H$), dimethylformamide and propanol, preferably propan-1-ol, are commercially available compounds.

In accordance with said step i) of the preparation process of the invention, the reaction mixture preferably has the following molar composition, based on one molar equivalent of the element zinc:

1 Zn: 0.2-0.7 $H_4$dhtp: 10-40 $H_2O$: 5-9 $C_3H_7OH$: 100-150 DMF

The solvothermal treatment of said step ii) of the preparation process of the invention is carried out under autogenous reaction pressure conditions. Said solvothermal treatment is preferably carried out at a temperature in the range 160° C. to 190° C. The duration of said treatment is in the range 8 to 72 hours, preferably in the range 10 to 30 hours. The solid obtained at the end of said step ii) is an IM-21 crystalline hybrid solid with an X-ray diffraction diagram including at least the peaks recorded in Table 1.

The IM-21 crystalline hybrid solid obtained at the end of said step ii) is filtered and washed with one or more appropriate solvents, in particular N,N-dimethylformamide (DMF) and ethanol. Next, in accordance with said step iii), said solid is dried at a temperature in the range 20° C. to 200° C., preferably in the range 20° C. to 100° C., still more preferably in the range 20° C. to 80° C., for a period which can vary from 1 to 24 hours, usually in the range 4 to 10 hours. The IM-21 crystalline hybrid solid obtained from said step iii) is in the as-synthesised form, i.e. in a form in which the porosity of said solid has not been liberated from the presence of solvents. Said solid obtained in its as-synthesised form has an X-ray diffraction diagram including at least the peaks included in Table 1.

In order to liberate the porosity of said IM-21 solid obtained from said step iii), it is subjected to a heat treatment carried out at a temperature in the range 150° C. to 500° C. The duration of said heat treatment is preferably in the range 1 hour to 3 days, preferably in the range 5 to 24 hours. The solid obtained from said step iv) of the preparation process of the invention is a porous solid: it is free of any solvent and is dehydrated.

In a preferred embodiment of the process of the invention, said step iv) is preceded by an exchange step consisting of exchanging at least one solvent used to carry out said step i), preferably the DMF, present in the pores of the IM-21 solid in its as synthesized form, with a solvent which is preferably selected from methanol, ethanol, isopropanol and acetonitrile. Highly preferably, said solvent is methanol. Said exchange step generally consists of immersing said solid in its as synthesized form obtained from said step iii) in said solvent, preferably in methanol. The exchange is carried out at a temperature in the range from ambient temperature to 110° C., preferably in the range 50° C. to 90° C., for 1 to 15 days. The solvent used for the exchange is preferably renewed regularly. At the end of said exchange step, the suspension containing the exchanged IM-21 solid in the solvent, preferably in methanol, is filtered then advantageously dried. Drying is carried out at a temperature in the range from ambient temperature to 100° C., preferably at ambient temperature, for a period in the range 2 to 12 hours.

The present invention also pertains to the use of said IM-21 hybrid solid as an adsorbent or catalyst. In particular, when used as an adsorbent, said IM-21 hybrid solid of the invention is advantageously used in a process for the separation of carbon dioxide present in a gaseous mixture to be purified, such as synthesis gas, natural gas or combustion fumes.

The invention will now be illustrated in the following examples, none of which is limiting in nature.

Example 1 (Invention)

Preparation of IM-21 Hybrid Solid with a Mixed Organic-Inorganic Matrix 9.73 g (133.1 mmole) of N,N-dimethylformamide (DMF) and 0.51 g (28.5 mmole) of distilled water were placed in a PTFE receptacle with an internal volume of 22.58 mL. 0.29 g (1 mmole) of zinc nitrate hexahydrate (Sigma Aldrich) was added. The mixture was stirred for 5 minutes using a magnetic stirrer. 0.10 g (0.5 mmole) of 2,5-dihydroxyterephthalic acid ($H_4$dhtp) (Sigma Aldrich) was then added. The mixture was stirred for 5 minutes. After homogenising, 0.41 g (6.9 mmole) of propan-1-ol (Alfa Aesar) was added. The molar composition of the obtained mixture was: 1.00 zinc nitrate: 0.5 $H_4$dhtp: 133.1 DMF: 34.5 $H_2O$: 6.9 propan-1-ol. The PTFE receptacle was then transferred into an autoclave and heated without stirring to 160° C. for 24 hours. After cooling, the crystalline solid obtained was filtered, washed with DMF then ethanol. After drying in air at 50° C. for approximately 6 hours, a crystalline solid was obtained in the form of a crystalline powder, corresponding to the solid in its as-synthesised form; it has an X-ray diffraction diagram which included the lines included in Table 1. This solid was denoted IM-21$_{as\text{-}synthesized}$.

Examples 1.1 to 1.4 below illustrate different protocols for obtaining porous IM-21 hybrid solid.

Example 1.1

The IM-21 solid in its as-synthesised form (IM-21$_{as\text{-}synthesized}$) was heated under vacuum for 12 hours at 300° C. The porous solid IM-21 was obtained. It had a specific surface area, evaluated by nitrogen adsorption at 77K and calculated by the BET method, which was equal to 326 m$^2$/g.

Example 1.2

The IM-21 solid in its as-synthesised form (IM-21$_{as\text{-}synthesized}$) was immersed in methanol at 70° C. for a period of ten days. The solid was filtered then heated under vacuum for 12 hours at 180° C. The porous solid IM-21 was obtained. It had a specific surface area, evaluated by nitrogen adsorption at 77K and calculated by the BET method, which was equal to 354 m$^2$/g.

Example 1.3

The IM-21 solid in its as-synthesised form (IM-21$_{as\text{-}synthesized}$) was immersed in methanol at 70° C. for a period of ten days. The solid was filtered then heated under vacuum for 12 hours at 350° C. The porous solid IM-21 was obtained. It had a specific surface area, evaluated by nitrogen adsorption at 77K and calculated by the BET method, which was equal to 489 m$^2$/g.

Example 1.4

The IM-21 solid in its as-synthesised form (IM-21$_{as\text{-}synthesized}$) was immersed in methanol at 70° C. for a period of ten days. The solid was filtered then heated under vacuum for 12 hours at 450° C. The porous solid IM-21 was obtained. It had a specific surface area, evaluated by nitrogen adsorption at 77K and calculated by the BET method, which was equal to 1030 m$^2$/g.

Example 2

Three batches of solids were prepared using the following protocol:

9.73 g (133.1 mmole) of N,N-dimethylformamide (DMF) and 0.51 g (28.5 mmole) of distilled water were placed in a PTFE receptacle with an internal volume of 22.58 mL. 0.29 g (1 mmole) of zinc nitrate hexahydrate (Sigma Aldrich) was added. The mixture was stirred for 5 minutes using a magnetic stirrer. 0.10 g (0.5 mmole) of 2,5-dihydroxyterephthalic acid (H$_4$dhtp) (Sigma Aldrich) was then added. The mixture was stirred for 5 minutes. After homogenising, 0.41 g (6.9 mmole) of propan-1-ol (Alfa Aesar) was added. The molar composition of the obtained mixture was: 1.00 zinc nitrate: 0.5 H$_4$dhtp: 133.1 DMF: 34.5 H$_2$O: 6.9 propan-1-ol.

The PTFE receptacle containing the first batch was then transferred into an autoclave and heated without stirring at 110° C. for 24 hours.

The PTFE receptacle containing the second batch was then transferred into an autoclave and heated without stirring at 120° C. for 24 hours.

The PTFE receptacle containing the second batch was then transferred into an autoclave and heated without stirring at 140° C. for 24 hours.

The PTFE receptacle containing the second batch was then transferred into an autoclave and heated without stirring at 160° C. for 24 hours.

After cooling each batch, the crystalline solid obtained was filtered, washed with DMF then ethanol. After drying in air at 50° C. for approximately 6 hours, a crystalline solid was obtained in the form of a crystalline powder, corresponding to the solid in its as-synthesised form. The X-ray diffraction diagrams are presented in FIG. 2. The simulated X-ray diffraction diagram for CPO-27 is also shown for reference.

Figure 2:
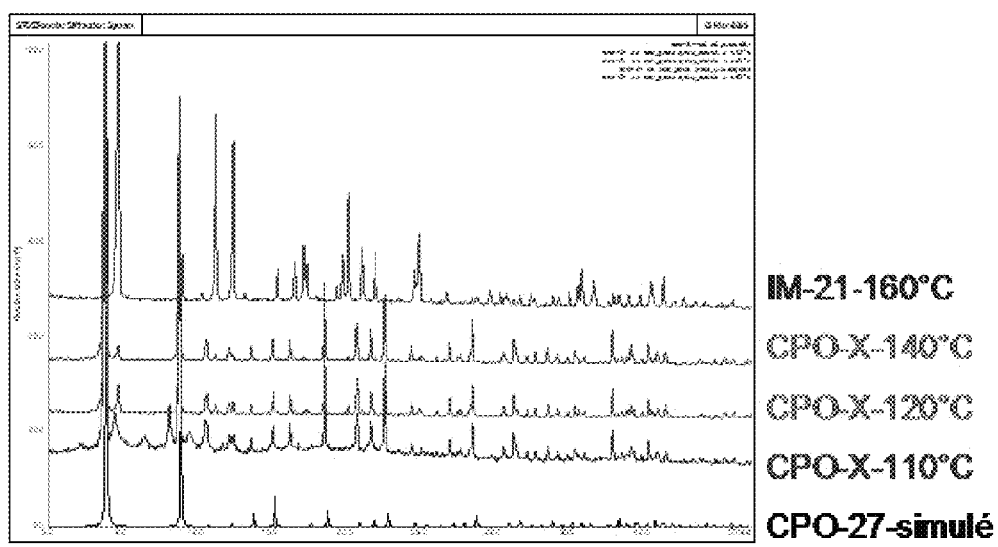
FIG. 2: X-ray diffraction diagrams of crystalline solids prepared in Example 2.

It can clearly be seen in FIG. 2 that for a solvothermal treatment temperature in the range 110° C. to 140° C., the solids obtained are a mixture of CPO-27 and IM-21. At 160° C., the solid obtained is pure IM-21.

The invention claimed is:

1. An IM-21 crystalline hybrid solid with a mixed organic-inorganic matrix, having a three-dimensional structure, containing an inorganic framework of metallic centers based on zinc connected together via deprotonated organic ligands constituted by the entity —O$_2$C—C$_6$H$_2$(O)$_2$—CO$_2$—, said solid having an X-ray diffraction diagram including at least the lines entered in the table below:

| 2θ (°) | I/I$_0$ | d$_{hkl}$ (Å) |
|---|---|---|
| 7.66 | s | 11.53 |
| 11.96 | w | 7.39 |
| 13.29 | w | 6.66 |
| 14.22 | m | 6.23 |
| 15.35 | m | 5.77 |
| 18.39 | w | 4.82 |
| 19.50 | w | 4.55 |
| 20.15 | w | 4.40 |
| 20.36 | w | 4.36 |
| 22.36 | w | 3.97 |
| 22.75 | w | 3.91 |
| 23.11 | mw | 3.84 |
| 24.04 | w | 3.70 |
| 24.91 | w | 3.57 |
| 27.57 | w | 3.23 |
| 27.87 | mw | 3.20 |
| 29.70 | w | 3.01 |
| 32.66 | w | 2.74 |
| 33.75 | w | 2.65 |
| 34.65 | w | 2.59 |
| 36.89 | w | 2.44 |
| 37.26 | w | 2.41 |
| 37.97 | w | 2.37 |
| 38.55 | w | 2.33 |
| 38.79 | w | 2.32 |
| 39.60 | w | 2.28 |
| 40.96 | w | 2.20 |
| 41.30 | w | 2.18 |
| 43.46 | w | 2.08 |
| 44.31 | w | 2.04 | where s=strong; m=medium; mw=medium weak; w=weak, the relative intensity I/I$_0$ being given using a relative intensity scale whereby a value of 100 is attributed to the most intense peak of the X-ray diffraction diagram: w<15; 15≤mw<30; 30≤m<85; s≥85.

2. An IM-21 crystalline hybrid solid according to claim 1, which is classified as a hexagonal system P, with lattice parameters a=b=23.0688 Å, c=15.9260 Å, V=7339.4 Å$^3$ and the angles α=β=90°, γ=120°.

3. An IM-21 crystalline hybrid solid according to claim 1, having a chemical composition with Zn$_2$(—O$_2$C—C$_6$H$_2$(O)$_2$—CO$_2$—) as a base motif.

4. A process for preparing an IM-21 crystalline hybrid solid with a mixed organic-inorganic matrix, comprising at least the following steps:

i) preparing, in an aqueous medium, a reaction mixture containing at least one zinc precursor and 2,5-dihydroxyterephthalic acid ($H_4$dhtp) present in a mixture of solvents comprising at least N,N-dimethylformamide (DMF) and propanol ($C_3H_7OH$) in a proportion such that said reaction mixture has the following molar composition, based on one molar equivalent of the element zinc:

1 Zn: 0.1-2 $H_4$dhtp: 1-50 $H_2O$: 3-10 $C_3H_7OH$: 50-300 DMF ii) carrying out a solvothermal treatment of said reaction mixture at a temperature in the range 150° C. to 290° C. in order to obtain said IM-21 crystalline hybrid solid in the as-synthesised form;

iii) filtering, washing and drying said IM-21 crystalline hybrid solid; and iv) heat treating said IM-21 crystalline hybrid solid obtained from step iii).

5. A preparation process according to claim 4, wherein said reaction mixture has the following molar composition, based on one molar equivalent of the element zinc:

1 Zn: 0.2-0.7 $H_4$dhtp: 10-40 $H_2O$: 5-9 $C_3H_7OH$: 100-150 DMF.

6. A preparation process according to claim 4, wherein said solvothermal treatment is carried out at a temperature in the range of 160° C. to 190° C.

7. A preparation process according to claim 4, wherein the duration of said solvothermal treatment is in the range of 8 to 72 hours.

8. A preparation process according to claim 4, wherein the heat treatment in step iv) is carried out at a temperature in the range of 150° C. to 500° C.

9. A preparation process according to claim 4, wherein the duration of the heat treatment in step iv) is in the range of 1 hour to 3 days.

10. A preparation process according to claim 4, wherein the solid obtained at the end of step iv) is a porous solid.

11. A preparation process according to claim 4, wherein step iv) is preceded by an exchange step consisting of exchanging at least one solvent used to carry out step i), present in the pores of the IM-21 solid in its as synthesized form, with a solvent.

12. A preparation process according to claim 11, wherein said exchange step is carried out at a temperature in the range of from ambient temperature to 110° C. for 1 to 15 days.

13. A preparation process according to claim 11, wherein said solvent is methanol, ethanol, isopropanol or acetonitrile.

14. A preparation process according to claim 11, wherein said exchange step is carried out at a temperature in the range of 50° C. to 110° C. for 1 to 15 days.

15. A preparation process according to claim 4, wherein the duration of said solvothermal treatment is in the range of 10 to 30 hours.

16. A preparation process according to claim 4, wherein in step iii) the solid is dried at a temperature in the range of 20° C. to 200° C. for a duration of 1 to 24 hours.

17. A preparation process according to claim 4, wherein the duration of the heat treatment in step iv) is in the range of 5 to 24 hours.

18. A process of separating carbon dioxide from a gaseous mixture comprising contacting said gaseous mixture with an adsorbent, wherein said adsorbent is an IM-21 crystalline solid according to claim 1.

19. A process of separating carbon dioxide from a gaseous mixture comprising contacting said gaseous mixture with an adsorbent, wherein said adsorbent is an IM-21 crystalline solid prepared according to claim 4.

* * * * *